US012168345B2

(12) United States Patent
Misawa et al.

(10) Patent No.: US 12,168,345 B2
(45) **Date of Patent: *Dec. 17, 2024**

(54) RECORDING DEVICE

(71) Applicant: SEIKO EPSON CORPORATION, Tokyo (JP)

(72) Inventors: Yuji Misawa, Matsumoto (JP); Toshihiro Imae, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,260

(22) Filed: Feb. 3, 2023

(65) Prior Publication Data

US 2023/0182491 A1 Jun. 15, 2023

Related U.S. Application Data

(63) Continuation of application No. 17/162,308, filed on Jan. 29, 2021, now Pat. No. 11,597,218.

(30) Foreign Application Priority Data

Jan. 31, 2020 (JP) ................................ 2020-014629

(51) Int. Cl.
*B41J 11/00* (2006.01)

(52) U.S. Cl.
CPC .................................. *B41J 11/007* (2013.01)

(58) Field of Classification Search
CPC ...................................................... B41J 11/007
See application file for complete search history.

(56) References Cited

U.S. PATENT DOCUMENTS 5,467,182 A 11/1995 Hower, Jr. et al.
9,156,292 B2 * 10/2015 Sakano .................... B41J 13/00
9,254,694 B2 * 2/2016 Tanjo ..................... B41J 11/006
(Continued)

FOREIGN PATENT DOCUMENTS

CN 1627197 6/2005
CN 101135877 3/2008
(Continued)

*Primary Examiner* — Sharon Polk
(74) *Attorney, Agent, or Firm* — WORKMAN NYDEGGER

(57) ABSTRACT

A recording device has: at least one medium storage section that stores a medium on which to perform recording; a recording section positioned vertically above the medium storage section, the recording section performing recording on the medium; and a reversing path by which the medium that passed through a position at which the medium faces the recording section is reversed in a direction including a vertically upward component by being transported in a transport direction including a vertically downward component and being made to pass through a curved reversing path curved so as to be convex downward. When only one medium storage section is provided, an overlap is found between at least part of the one medium storage section and at least part of the curved reversing path when viewed horizontally. When a plurality of medium storage sections are provided, an overlap is found between at least part of the topmost medium storage section in the vertical direction and at least part of the curved reversing path when viewed horizontally.

20 Claims, 3 Drawing Sheets

(56) References Cited

U.S. PATENT DOCUMENTS

| | | | | |
|---|---|---|---|---|
| 9,840,100 | B2 * | 12/2017 | Tanjo | B41J 29/13 |
| 10,603,926 | B2 | 3/2020 | Ohta et al. | |
| 10,864,747 | B2 | 12/2020 | Nakagawa et al. | |
| 11,597,218 | B2 * | 3/2023 | Misawa | B41J 3/60 |
| 2005/0129439 | A1 | 6/2005 | Asano | |
| 2008/0056772 | A1 | 3/2008 | Utsumi et al. | |
| 2018/0236791 | A1 | 8/2018 | Ohashi et al. | |
| 2018/0281430 | A1 | 10/2018 | Ohta et al. | |
| 2019/0009563 | A1 | 1/2019 | Tokisawa et al. | |
| 2019/0111703 | A1 | 4/2019 | Nakagawa et al. | |

FOREIGN PATENT DOCUMENTS

| | | | |
|---|---|---|---|
| JP | 2001-114436 | | 4/2001 |
| JP | 2001-114436 | A | 4/2001 |
| JP | 2004-189386 | | 7/2004 |
| JP | 2004-189386 | A | 7/2004 |
| JP | 2010-274580 | | 12/2010 |
| JP | 2010-274580 | A | 12/2010 |
| JP | 2014-065293 | A | 4/2014 |
| JP | 2018-130936 | | 8/2018 |
| JP | 2018-174519 | | 11/2018 |
| JP | 2018-174519 | A | 11/2018 |
| JP | 2019-014253 | | 1/2019 |
| JP | 2019-073011 | A | 5/2019 |
| JP | 6624398 | | 12/2019 |

* cited by examiner

RECORDING DEVICE

This application is a continuation application of U.S. patent application Ser. No. 17/162,308, filed Jan. 29, 2021, which claims the benefit of and priority to Japanese Patent Application Serial Number 2020-014629, filed Jan. 31, 2020, the disclosure of which is hereby incorporated by reference herein in its entirety.

BACKGROUND

1. Technical Field

The present disclosure relates to a recording device that performs recording on a medium.

2. Related Art

Some of recording devices typified by facsimiles, printers, and the like have a path by which a recording medium typified by a recording sheet is reversed so that recording is performed on both sides of the recording medium.

An ink jet recording devices described in JP-A-2019-14253 has a first cassette and a second cassette to store recording media. When fed out of any of these cassettes, the recording medium is fed to a position at which the recording medium faces a recording head positioned above the cassettes. Then, recording is performed on a first surface. After recording has been performed on the first surface, the recording medium is transported vertically upward and is then transported vertically downward, that is, transported so as to be switched back. The recording medium is then fed to a reversing path through which the recording medium is reversed. The recording medium is reversed on the reversing path so that the transport direction is changed from a downward transport direction to an upward transport direction, after which the recording medium is fed again to the position at which the recording medium faces the recording head. At that position, recording is performed on a second surface.

When a longer reversing path is used to reverse the recording medium, the reversing path is more advantageous in that, for example, the reversing path is adaptable to longer recording media and a time for drying can be assured. To elongate the reversing path used to reverse the recording medium in the path layout described in JP-A-2019-14253, however, it is necessary to move a structural body vertically upward, the structural body being placed vertically above the reversing path. Alternatively, it is necessary to move another structural body vertically downward, the other structural body being placed vertically below a curved path by which the recording medium is reversed so that its downward transport direction is changed to an upward transport direction. This increases the height of the recording device.

SUMMARY

An aspect of the present disclosure that solves the above problem is a recording device that has: at least one medium storage section that stores a medium on which to perform recording; a recording section positioned vertically above the medium storage section, the recording section performing recording on the medium; and a reversing path by which the medium that passed through a position at which the medium faces the recording section is reversed in a direction including a vertically upward component by being transported in a transport direction including a vertically downward component and being made to pass through a curved reversing path curved so as to be convex downward. When only one medium storage section is provided, an overlap is found between at least part of the one medium storage section and at least part of the curved reversing path when viewed horizontally. When a plurality of medium storage sections are provided, an overlap is found between at least part of the topmost medium storage section in the vertical direction and at least part of the curved reversing path when viewed horizontally.

DESCRIPTION OF EXEMPLARY EMBODIMENTS

Figure 1:
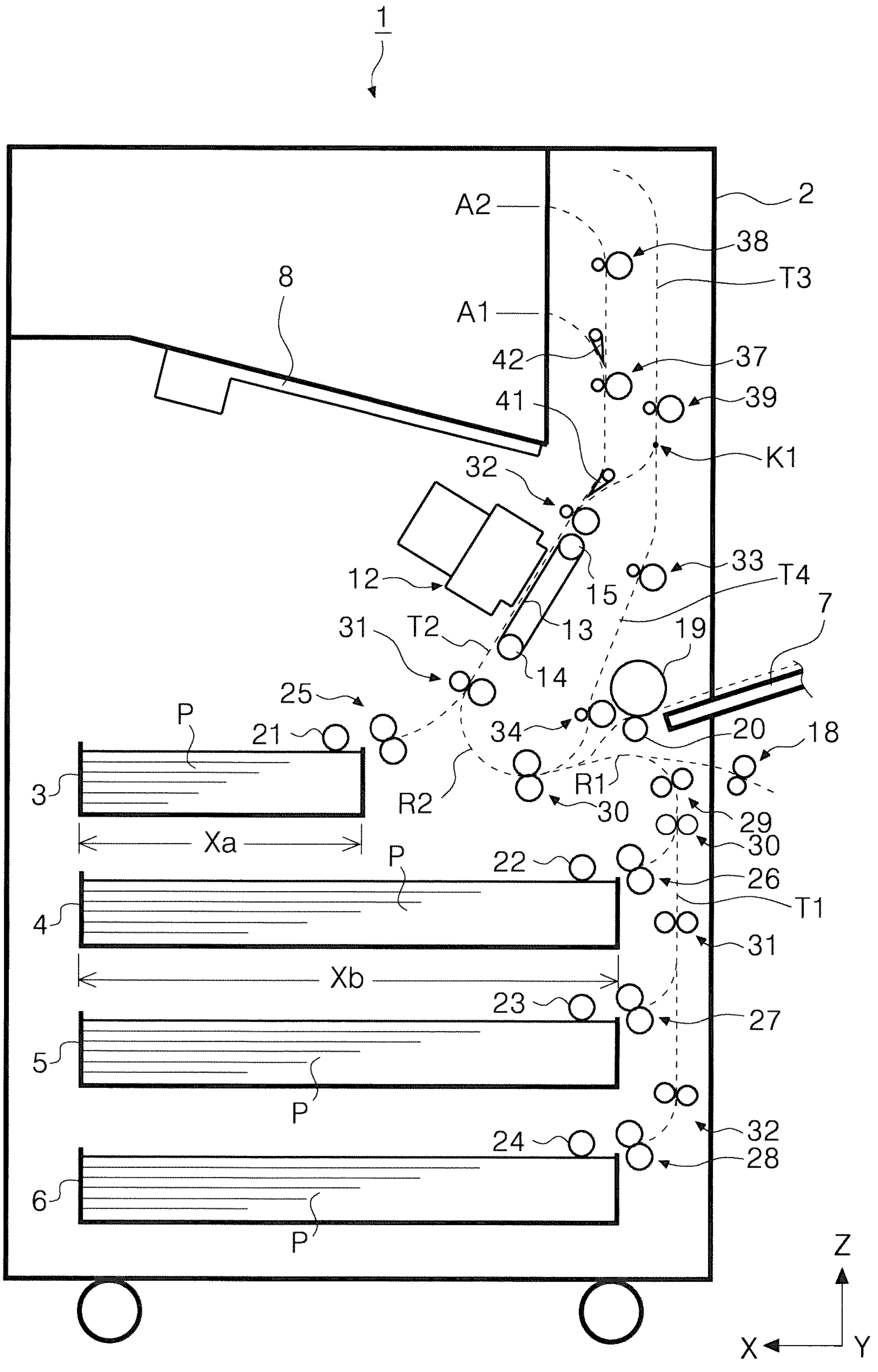
FIG. 1 illustrates medium transport paths in an ink jet printer in an embodiment.

A general description of the present disclosure will be given below.

A recording device according to a first aspect has: at least one medium storage section that stores a medium on which to perform recording; a recording section positioned vertically above the medium storage section, the recording section performing recording on the medium; and a reversing path by which the medium that passed through a position at which the medium faces the recording section is reversed in a direction including a vertically upward component by being transported in a transport direction including a vertically downward component and being made to pass through a curved reversing path curved so as to be convex downward. When only one medium storage section is provided, an overlap is found between at least part of the one medium storage section and at least part of the curved reversing path when viewed horizontally. When a plurality of medium storage sections are provided, an overlap is found between at least part of the topmost medium storage section in the vertical direction and at least part of the curved reversing path when viewed horizontally.

According to this aspect, when only one medium storage section is provided, an overlap is found between at least part of the one medium storage section and at least part of the curved reversing path when viewed horizontally; and when a plurality of medium storage sections are provided, an overlap is found between at least part of the topmost medium storage section in the vertical direction and at least part of the curved reversing path when viewed horizontally. Therefore, even if the curved reversing path is placed at a lower position to assure a sufficient length of the reversing path, it is possible to restrain the size of the recording device in its height direction from becoming large.

In a second aspect, in the recording device according to the first aspect, the lower end of the curved reversing path in the vertical direction is vertically below the upper end of the medium storage section in the vertical direction.

According to this aspect, even if the curved reversing path is placed at a lower position to assure a sufficient length of the reversing path, it is possible to restrain the size of the recording device in its height direction from becoming large.

In a third aspect, in the recording device according to the second aspect, the recording device further has a plurality of medium storage sections disposed vertically; a first medium storage section, which is the topmost medium storage section of the plurality of medium storage sections, is smaller in size than a second medium storage section below the first medium storage section in a direction in which the medium was fed out of the medium storage section; and at least part of the curved reversing path is placed in a space formed by the difference in size between the first medium storage section and the second medium storage section.

According to this aspect, a space adjacent to the first medium storage section is formed due to the difference in size between the first medium storage section and the second medium storage section. Since at least part of the curved reversing path is placed in this space, the space can be effectively used to restrain the size of the recording device in its height direction from becoming large.

In a fourth aspect, in the recording device according to the third aspect, there is no match between any horizontal position of the curved reversing path and any horizontal position of the first medium storage section, and there is a match between a horizontal position of the curved reversing path and a horizontal position of the second medium storage section.

According to this aspect, the space can be effectively used to restrain the size of the recording device in its height direction from becoming large.

In a fifth aspect, in the recording device according to the fourth aspect, there is no match between the horizontal position of an ejection position from which to eject the medium to an ejection tray and any horizontal position of the first medium storage section.

According to this aspect, even if the curved reversing path is placed at a lower position to assure a sufficient length of the reversing path, it is possible to restrain the size of the recording device in its height direction from becoming large.

In a sixth aspect, in the recording device according to the fifth aspect, there is a match between the horizontal position of the ejection position and a horizontal position of the second medium storage section.

According to this aspect, it is possible to restrain the horizontal size of the recording device from becoming large.

In a seventh aspect, in the recording device according to the fifth or sixth aspect, the curved reversing path is provided toward both horizontal sides of the horizontal position of the ejection position.

According to this aspect, it is possible to restrain the horizontal size of the recording device from becoming large.

In an eighth aspect, in the recording device according to the third to seventh aspects, the first medium storage section is larger in vertical size than the second medium storage section.

According to this aspect, the vertical size of the space adjacent to the first medium storage section can be made larger. Therefore, the curved reversing path can be placed at a lower position, making it possible to still further assure a sufficient length of the reversing path.

In a ninth aspect, in the recording device according to any one of the first to eighth aspects, the recording device further has a transport path that passing through a position at which the transport path faces the recording section, the transport path forming an angle with respect to the horizontal direction and vertical direction to transport the medium upward.

According to this aspect, a transport path passing through a position at which the transport path faces the recording section forms an angle with respect to the horizontal direction and vertical direction to transport the medium upward. Therefore, it is possible to restrain the horizontal size of the recording device from becoming large.

In a tenth aspect, in the recording device according to the ninth aspect, the transport path passing through the position at which the transport path faces the recording section is inclined within the range from 50° to 70° with respect to the horizontal direction.

According to this aspect, it is possible to restrain the horizontal size of the recording device from becoming large.

In an eleventh aspect, in the recording device according to the ninth or tenth aspect, the transport path passing through the position at which the transport path faces the recording section is formed from a transport belt that transports the medium. The transport belt is vertically above the upper end of the medium storage section in the vertical direction.

According to this aspect, the transport belt and recording section can be placed vertically above the medium storage section. Therefore, it is possible to restrain the horizontal size of the recording device from becoming large.

In a twelfth aspect, in the recording device according to the ninth to eleventh aspect, the reversing path includes a downward transport path located upstream of the curved reversing path, the downward transport path being used to transport the medium in a transport direction including a vertically downward component; the downward transport path is not parallel to the transport path passing through the position at which the transport path faces the recording section when viewed horizontally.

According to this aspect, the transport belt and recording section can be placed vertically above the medium storage section. Therefore, it is possible to restrain the horizontal size of the recording device from becoming large.

In a thirteenth aspect, in the recording device according to any one of the first to twelfth aspects, the recording device further has a supply path through which the medium fed out of the medium storage section passes through a curved supply path curved so as to be convex upward to reverse the medium in a transport direction including a component in a direction opposite to the direction in which the medium was fed out of the medium storage section. The supply path joins the reversing path and at least part of the curved reversing path and at least part of the curved supply path overlap when viewed horizontally.

According to this aspect, at least part of the curved reversing path and at least part of the curved supply path overlap when viewed horizontally. Therefore, even if the curved reversing path is placed at a lower position to assure a sufficient length of the curved reversing path, it is possible to restrain the size of the recording device in its height direction from becoming large.

In a fourteenth aspect, in the recording device according to the thirteenth aspect, the lower end of the curved reversing path in the vertical direction is vertically below the upper end of the curved supply path in the vertical direction.

According to this aspect, even if the curved reversing path is placed at a lower position to assure a sufficient length of the reversing path, it is possible to restrain the size of the recording device in its height direction from becoming large.

In a fifteenth aspect, in the recording device according to the fourteenth aspect, the upper end of the curved supply path is vertically below the upper end of the medium storage section in the vertical direction.

According to this aspect, it is possible to restrain the size of the recording device in its height direction from becoming large.

In a sixteenth aspect, in the recording device according to the fourteenth and fifteenth aspects, the recording device further has: a first transport roller that transports the medium, the first transport roller being disposed upstream of the upper end of the curved supply path; and a second transport roller that transports the medium, the second transport roller being disposed downstream of the upper end of the curved supply path. The supply path and the reversing path join together between the first transport roller and the second transport roller.

According to this aspect, the second transport roller can be used to transport the medium on the supply path and the medium on the reversing path. Therefore, to assure a sufficient length of the reversing path, the curved reversing path can be placed at a lower position.

In a seventeenth aspect, in the recording device according to the sixteenth aspect, when only one medium storage section is provided, a position at which the supply path and the reversing path join together overlaps at least part of the one medium storage section when viewed horizontally; and when a plurality of medium storage sections are provided vertically, the position overlaps at least part of the topmost medium storage section when viewed horizontally.

According to this aspect, it is possible to restrain the size of the recording device in its height direction from becoming large.

In an eighteenth aspect, in the recording device according to the thirteenth to seventeenth aspects, the curvature of the curved reversing path is smaller than the curvature of the curved supply path.

According to this aspect, the curvature of the curved reversing path is smaller than the curvature of the curved supply path. Therefore, when the medium is curved on the curved reversing path, that is, the medium that has been subject to recording on a first surface is curved, the curve can be made more gentle than when the medium is curved on the curved supply path, that is, the medium yet to be subject to recording on the first surface and a second surface is curved. That is, since the medium that has been subject to recording is curved more gentle, the medium is less likely to suffer from damage such as wrinkles, leading to a superior recording result.

In a nineteenth aspect, in the recording device according to the eighteenth aspect, the recording device further has a supply roller located vertically above the curved supply path, the supply roller feeding the medium to the interior of the recording device through a supply tray protruding from a side surface of the recording device toward the outside of the recording device; the reversing path includes a downward transport path located upstream of the curved reversing path, the downward transport path being inclined in a direction toward the central portion of the recording device from an outer surface of the recording device, the downward transport path being used to transport the medium in a transport direction including a vertically downward component; and at least part of the downward transport path and at least part of the supply roller overlap when viewed vertically.

According to this aspect, the downward transport path is inclined and at least part of the supply roller enters a space formed by the inclination of the downward transport path. Therefore, it is possible to restrain the size of the recording device in its height direction from becoming large.

In a twentieth aspect, in the recording device according to the nineteenth aspect, the medium to be fed to the interior of the recording device through the supply tray enters the reversing path.

According to this aspect, in the structure in which the medium to be fed to the interior of the recording device through the supply tray enters the reversing path, the effect in the fifth aspect described above is obtained.

An embodiment of the present disclosure will be concretely described below.

An ink jet printer 1 will be described below as an example of a recording device. The ink jet printer 1 discharges an ink, which is an example of a liquid, to a medium typified by a recording sheet to perform recording. In the description below, the ink jet printer 1 will be simply referred to as the printer 1.

In the drawings, the X-Y-Z coordinate system is an orthogonal coordinate system. The Y-axis direction is a medium width direction crossing a transport direction in which the medium is transported. The Y-axis direction is also the depth direction of the printer 1. The X-axis direction is the width direction of the printer 1; when viewed from the operator of the printer 1, the +X direction is toward the left side and the −X direction is toward the right side. The −X direction is also is a feed direction in which the medium is fed out of a medium cassette, which will be described below. The Z-axis direction is the vertical direction, that is, the height direction of the printer 1; the +Z direction is upward and the −Z direction is downward.

In the description below, a side toward which the medium is fed will be referred to as a downstream and a side opposite to the downstream will sometimes be referred to as an upstream. In the drawings, medium transport paths are indicated by dashed lines. In the printer 1, the medium is transported along medium transport paths indicated by dashed lines.

The printer 1 has a plurality of medium cassettes at the bottom of a device body 2 so as to be placed vertically. In this embodiment, a first medium cassette 3 is placed at the topmost position, followed by a second medium cassette 4, a third medium cassette 5, and a fourth medium cassette 6 in that order toward the downward direction. The reference symbol P indicates a medium stored in the relevant medium cassette. Each medium cassette is an example of a medium storage section.

The length Xa of the first medium cassette 3 in the X-axis direction is shorter than the length Xb of the second medium cassette 4 in the X-axis direction. That is, in the X-axis direction, the first medium cassette 3 is smaller in size than the second medium cassette 4. The lengths of the third medium cassette 5 and fourth medium cassette 6 in the X-axis direction are the same as the length of the second medium cassette 4 in the X-axis direction.

In the first medium cassette 3, A4-sized sheets can be stored so that their longer-edge direction matches the X-axis direction, as an example. In the second medium cassette 4, third medium cassette 5, and fourth medium cassette 6, A3-sized sheets can be stored so that their longer-edge direction matches the X-axis direction, as an example.

In this embodiment, all medium cassettes have the same size in the vertical direction. That is, the number of storable media is the same in all medium cassettes.

For each medium cassette, a pick roller is provided that feeds out a stored medium in the −X direction. A pick roller 21 is attached to the first medium cassette 3, a pick roller 22 is attached to the second medium cassette 4, a pick roller 23 is attached to the third medium cassette 5, and a pick roller 24 is attached to the fourth medium cassette 6.

For each medium cassette, a supply roller pair is also provided that supplies the medium that has been fed out in the −X direction, the medium being supplied in a diagonally upward direction including a −X-direction component and a +Z-direction component. A supply roller pair 25 is attached to the first medium cassette 3, a supply roller pair 26 is attached to the second medium cassette 4, a supply roller pair 27 is attached to the third medium cassette 5, and a supply roller pair 28 is attached to the fourth medium cassette 6.

Unless otherwise noted in the description below, each roller pair will be assumed to have a driving roller driven by a motor (not illustrated) and a driven roller that is in contact with the driving roller so as to be rotated by it.

When the medium is fed out of the first medium cassette 3 and is fed by the supply roller pair 25 in a diagonally upward direction, the medium is further fed in a diagonally upward direction including a −X-direction component and a +Z-direction component without being reversed until the medium reaches a recording-time transport path T2, which will be described later.

When the medium is fed out of the second medium cassette 4 and is fed by the supply roller pair 26 in a diagonally upward direction, the medium receives a feed force from a transport roller pair 30 and is further fed upward, after which the medium reaches a transport roller pair 29.

When the medium is fed out of the third medium cassette 5 and is fed by the supply roller pair 27 in a diagonally upward direction, the medium is further fed upward by a transport roller pair 31 and the transport roller pair 30, after which the medium reaches the transport roller pair 29.

When the medium is fed out of the fourth medium cassette 6 and is fed by the supply roller pair 28 in a diagonally upward direction, the medium is further fed upward by a transport roller pair 32, the transport roller pair 31, and the transport roller pair 30, after which the medium reaches the transport roller pair 29.

The transport roller pair 29 feeds the medium in a diagonally upward direction including a +X-direction component and a +Z-direction component as with the supply roller pairs described above.

A medium transport path formed downstream of the transport roller pair 29 is curved so as to be convex upward. The medium passes through this curved path portion and reaches another transport roller pair 30. In the description below, a medium transport path through which the medium is fed out of each medium cassette passes until the medium reaches the other transport roller pair 30 will be referred to as a supply path T1. Of the supply path T1, the path curved between the transport roller pair 29 and the other transport roller pair 30 so as to be convex upward will be referred to as a first curved path R1. The first curved path R1 is an example of a curved supply path. Due to the supply path T1, the medium fed out of the relevant medium cassette other than the first medium cassette 3 is reversed in a transport direction including a component in the +X direction opposite to the direction in which the medium has been fed out of the medium cassette, that is, the −X-direction. This supply path T1 joins a reversing path T4, which will be described later, in the vicinity of the upstream of the other transport roller pair 30.

An external transport roller pair 18, illustrated in the vicinity of the transport roller pair 29 and outside the device body 2, is provided in an additional unit (not illustrated in FIG. 1). This additional unit is structured so that media can be stored and that a medium fed out of a feed roller (not illustrated) can be supplied to the interior of the printer 1 by the external transport roller pair 18.

A supply tray 7 is provided in the vicinity of the first curved path R1 so as to protrude from a side surface of the device body 2 toward the outside of the printer 1. The supply tray 7 is intended for manual feed of a medium. The medium is supplied by a supply roller 19 and a separation roller 20 from the supply tray 7 to the interior of the printer 1. The medium to be fed from the supply tray 7 to the interior of the printer 1 enters the supply path T1, after which the medium further enters the reversing path T4, which will be described later.

The medium then receives a feed force from the transport roller pair 29, passes through a curved path curved so as to be convex downward, and reaches the transport roller pair 31. In the description below, the curved path curved between a transport roller pair 34 and the transport roller pair 31 so as to be convex downward will be referred to as a second curved path R2. The second curved path R2 is an example of a curved reversing path. The second curved path R2 is part of the reversing path T4, which will be described later.

The medium receives a feed force from the transport roller pair 31 and is fed to a position between a transport belt 13 and a line head 12, which is an example of a recording section and a liquid discharge head, that is, a recording position at which the medium faces the line head 12. In the description below, a medium transport path from the transport roller pair 31 to the transport roller pair 32 will be referred to as a recording-time transport path T2.

The line head 12 executes printing by discharging an ink, which is an example of a liquid, to a surface of the medium. The line head 12 is an ink discharge head structured so that nozzles that discharge inks cover the entire area of the medium in its width direction. Specifically, the line head 12 is structured as an ink discharge head that can perform printing in the entire area of the medium in its width direction without having to move in the width direction of the medium. However, the ink discharge head is not limited to this type of head. The ink discharge head may be of a type in which the ink discharge head is mounted on a carriage and discharges an ink while moving in the width direction of the medium.

The transport belt 13 is an endless belt placed on a pulley 14 and a pulley 15. At least one of the pulley 14 and pulley 15 is driven by a motor (not illustrated) to rotate the transport belt 13. The medium is transported through a position at which the medium faces the line head 12 while adhering to the belt surface of the transport belt 13. To have the medium adhere to the transport belt 13, a known adhesion method such as an air adhesion method or an electrostatic adhesion method can be used.

The recording-time transport path T2 passing through the position at which the recording-time transport path T2 faces the line head 12 forms an angle with respect to the horizontal and vertical directions to transport the medium upward. This upward transport direction is a direction including a −X-direction component and a +Z-direction component in FIG. 1. This structure makes it possible to restrain the horizontal size of the printer 1 from becoming large.

In this embodiment, the recording-time transport path T2 is inclined within the range from 50° to 70° with respect to the horizontal direction. Specifically, the recording-time transport path T2 is inclined at an angle of about 60°.

After recording has been performed on a first surface of the medium by the line head 12, the medium is further fed by the transport roller pair 32 positioned downstream of the transport belt 13 in a diagonally upward direction including a −X-direction component and a +Z-direction component.

A flap 41 is provided downstream of the transport roller pair 32. The flap 41 switches the transport direction of the medium. When the medium is to be ejected without being subject to further recording, the transport path for the medium is switched by the flap 41 so as to be directed toward the transport roller pair 37 above the flap 41. A flap 42 is also provided downstream of the transport roller pair 37. The transport path is switched by this flap 42 so that either ejection from an ejection position A1 or transport to a transport roller pair 38 is performed, the transport roller pair 38 being positioned vertically above the flap 42. When the medium is fed toward the transport roller pair 38, the medium is ejected from an ejection position A2.

When the medium is ejected from the ejection position A1, the medium is accepted by an ejection tray 8 inclined in a diagonally upward direction including a +X-direction component and a +Z-direction component. When the medium is ejected from the ejection position A2, the medium is accepted by an optional tray (not illustrated).

When recording is to be performed on a second surface of the medium besides the first surface, the medium is fed by the flap 41 in a diagonally upward direction including a −X-direction component and a +Z-direction component, passes through a branch position K1, and enters a switch-back path T3. In this embodiment, the switch-back path T3 is a medium transport path extending upward from the branch position K1. The transport roller pair 39 is provided beside the switch-back path T3. When the medium enters the switch-back path T3, the medium is transported upward by the transport roller pair 39. When the rear edge of the medium passes through the branch position K1, the rotational direction of the transport roller pair 39 is switched to transport the medium downward.

The reversing path T4 is coupled to the switch-back path T3. In this embodiment, the reversing path T4 starts from the branch position K1, passes through a transport roller pair 33, the transport roller pair 34 and the other transport roller pair 30, and terminates at the transport roller pair 31. The reversing path T4 includes the second curved path R2 described above.

When the medium is transported downward by the transport roller pair 33, the medium receives a feed force from the transport roller pairs 33 and 34, and arrives at the other transport roller pair 30, after which the medium is fed again by the other transport roller pair 30 to the position at which the medium faces the line head 12. That is, the reversing path T4 is used to transport the medium in a transport direction including a vertically downward component, to cause the medium to pass through the second curved path R2 curved so as to be convex downward, and to reverse the medium in a transport direction including a vertically upward component.

When the medium is fed again to the position at which the medium faces the line head 12, the second surface of the medium faces the line head 12, the second surface being opposite to the first surface on which recording has been already performed. Thus, the second surface of the medium becomes ready for recording by the line head 12. When recording is performed on the second surface of the medium, it is ejected from the ejection position A1 or A2.

The structure of the printer 1 will be further described below in detail with reference to FIG. 2.

Figure 2:
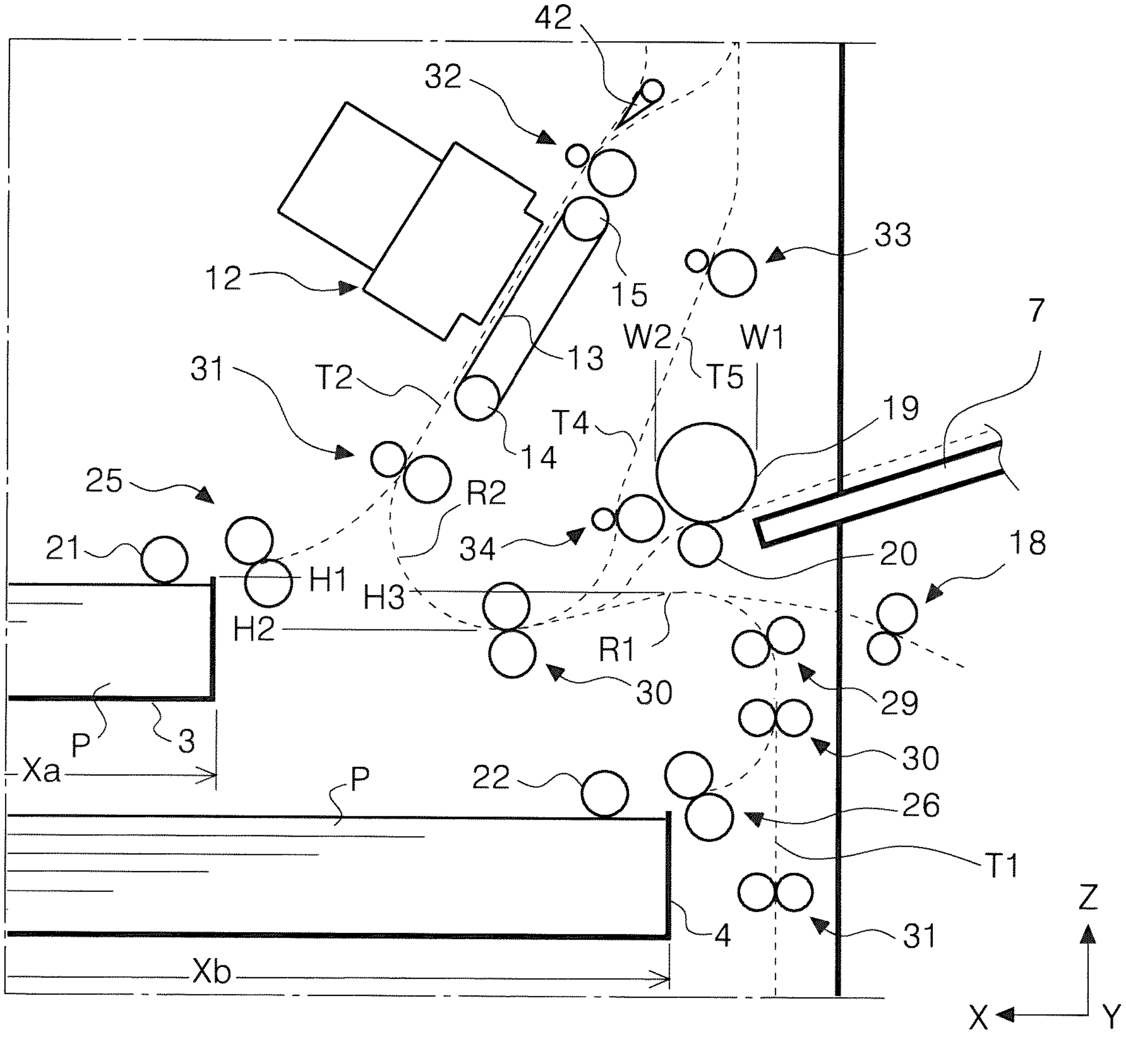
FIG. 2 is partially enlarged view of the ink jet printer in FIG. 1.

In FIG. 2, the position H1 is the upper end of the first medium cassette 3 in the vertical direction and the position H2 is the lower end of the second curved path R2 in the vertical direction. The position H2 is below the position H1 in the vertical direction. That is, at least part of the first medium cassette 3 and at least part of the second curved path R2 overlap each other when viewed from the X-axis direction, which is one of horizontal directions. In other words, there is an overlap in the vertical direction between at least part of the first medium cassette 3 and at least part of the second curved path R2.

Therefore, even if the second curved path R2 is placed at a lower position to assure a sufficient length of the reversing path T4, it is possible to restrain the size of the printer 1 in its height direction from becoming large.

Although, in this embodiment, part of the first medium cassette 3 and part of the second curved path R2 overlap each other when viewed from the X-axis direction, the whole of the first medium cassette 3 may overlap part of the second curved path R2 or the whole of the second curved path R2 may overlap part of the first medium cassette 3.

In the X-axis direction, the first medium cassette 3 is smaller in size than the second medium cassette 4 as described below. Due to this difference in size, a space for the first medium cassette 3 is formed in the −X direction. At least part of the second curved path R2 is placed in this space. That is, the space formed due to the difference in size between the first medium cassette 3 and the second medium cassette 4 is effectively used to restrain the size of the printer 1 in its height direction from becoming large.

In FIG. 2, the position H3 is the upper end of the first curved path R1 in the vertical direction. The position H3 is above the position H2 in the vertical direction. That is, at least part of the first curved path R1 and at least part of the second curved path R2 overlap each other when viewed horizontally. In other words, there is an overlap in the vertical direction between at least part of the first curved path R1 and at least part of the second curved path R2.

This structure makes it possible to still further restrain the size of the printer 1 in its height direction from becoming large.

In this embodiment, the curvature of the second curved path R2 is smaller than the curvature of the first curved path R1. Therefore, when the medium is curved on the second curved path R2, the curve can be made more gentle than when the medium is curved on the first curved path R1, that is, when the medium yet to be subject to recording on the first surface and second surface is curved. That is, since the medium the stiffness of which has been lowered due to printing already performed on the medium is curved more gentle, the medium is less likely to suffer from damage such as wrinkles, leading to a superior recording result.

In the reversing path T4, a downward transport path T5 is included upstream of the second curved path R2 so as to be inclined in a direction toward the central portion of the printer 1 from an outer surface of the printer 1. The medium is transported through the downward transport path T5 in a transport direction including a vertically downward component. The downward transport path T5, which is part of the reversing path T4, is a linear path extending from the vicinity of the upstream of the transport roller pair 33 to the transport roller pair 34.

Since this linear downward transport path T5 is inclined, a space is formed below the downward transport path T5. The supply roller 19 is placed in this space. In FIG. 2, the position W1 is the end of the supply roller 19 in the −X direction and the position W2 is the end of the supply roller 19 in the +X direction. As is clear from FIG. 2, at least part of the downward transport path T5 and at least part of the supply roller 19 overlap each other when viewed vertically. In other words, there is an overlap in the horizontal direction between at least part of the downward transport path T5 and at least part of the supply roller 19. This structure makes it possible to restrain the size of the printer 1 in the horizontal direction from becoming large.

Although, in this embodiment, part of the downward transport path T5 and part of the supply roller 19 overlap each other when viewed vertically, the whole of the downward transport path T5 may overlap part of the supply roller 19 or the whole of the supply roller 19 may overlap part of the downward transport path T5.

Figure 3:
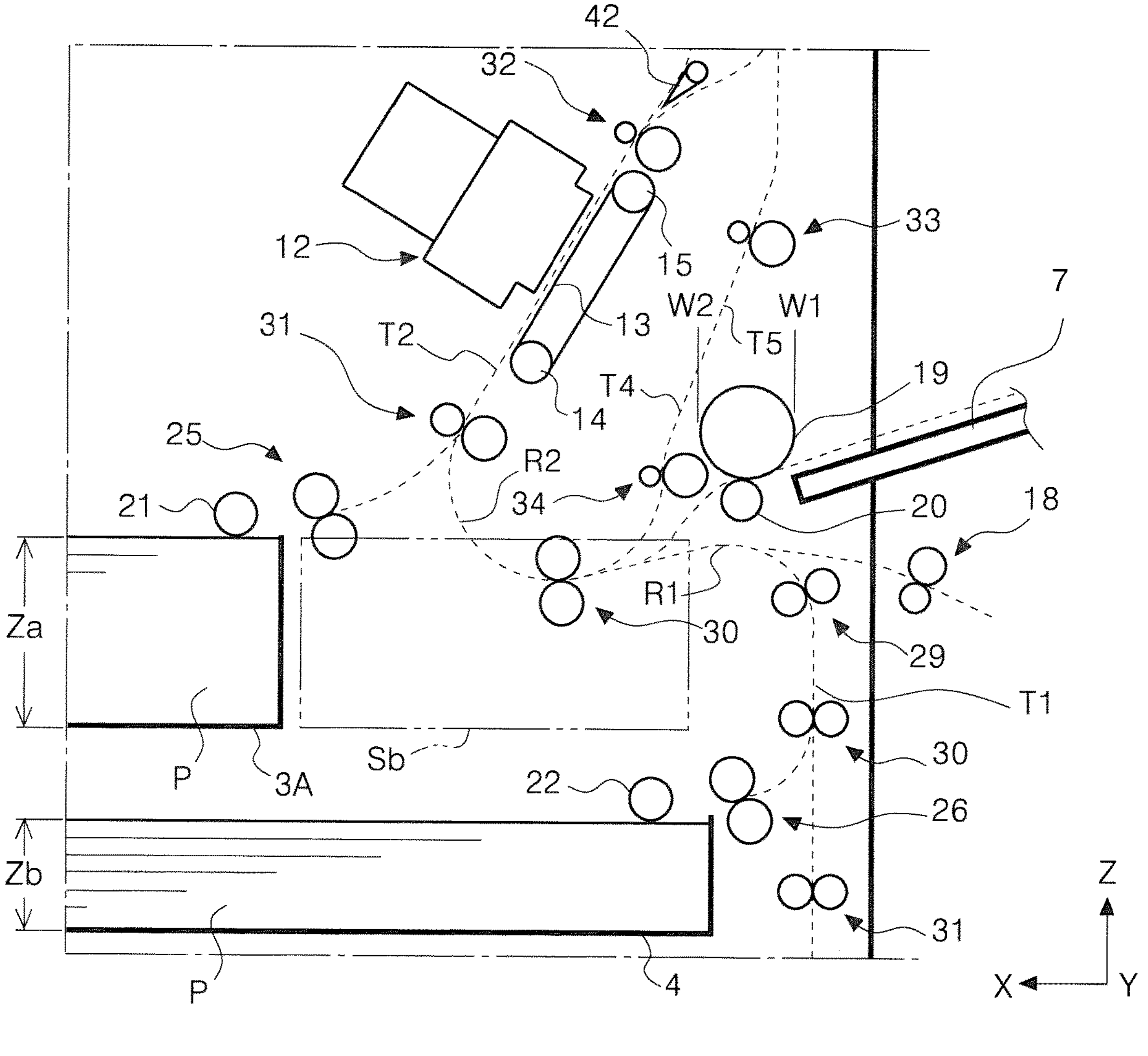
FIG. 3 illustrates part of medium transport paths in an ink jet printer in another embodiment.

Next, another embodiment will be described with reference to FIG. 3. In FIG. 3, a first medium cassette 3A is a variation of the first medium cassette 3 described above. The vertical size Za of the first medium cassette 3A in this variation is larger than the vertical size Zb of the second medium cassette 4. That is, the first medium cassette 3A is structured so that it can store more media than the second medium cassette 4. Although not illustrated in FIG. 3, the vertical sizes of the third medium cassette 5 and fourth medium cassette 6, that is, the number of media that can be stored in the third medium cassette 5 and fourth medium cassette 6, are the same as the vertical size of the second medium cassette 4.

With this structure, the vertical size of a space Sb adjacent to the first medium cassette 3A can be made larger. Therefore, the second curved path R2 can be placed at a lower position, making it possible to still further assure a sufficient length of the reversing path T4. It is also possible to increase the number of storable frequently-used media such as A4-sized sheets described above as an example.

Not only the second curved path R2 but also another structural member can be placed in the space Sb. For example, an effluent storage section can be placed that holds an ink as an effluent when the ink is discharged from the line head 12 toward a flushing cap (not illustrated) for maintenance.

The present disclosure is not limited to the embodiments described above. Various variations are possible without departing from the intended scope of the present disclosure described in the claims. It will be understood that these variations are also included in the range of the present disclosure.

For example, although, in the above embodiments, a plurality of medium cassettes are provided vertically, only one medium cassette may be provided.

Another example is that although, in the embodiments described above, the recording-time transport path T2 is inclined upward, the recording-time transport path T2 may be formed along the vertical direction or horizontal direction.

Another example is that although, in the embodiments described above, the downward transport path T5 is inclined downward, if an overlap in the horizontal direction between the downward transport path T5 and the supply roller 19 does not need to be considered, the downward transport path T5 may be formed along the vertical direction.

Another example is that a supply unit that supplies a medium from the supply tray 7 and another supply unit by which a medium is supplied from the additional unit by the external transport roller pair 18 may be eliminated.

What is claimed is:

1. A recording device comprising:

a first medium storage section that stores a medium on which to perform recording;

a second medium storage section that stores a medium on which to perform recording and that is disposed below the first medium storage section;

a recording section positioned vertically above the second medium storage section, the recording section performing recording on the medium; and a supply path through which the medium fed out of the second medium storage section passes through a curved supply path curved so as to be convex upward to reverse the medium in a transport direction including a component in a direction opposite to the direction in which the medium was fed out of the second medium storage section, wherein the upper end of the curved supply path in the vertical direction is vertically above a lower end of the first medium storage section in the vertical direction.

2. The recording device according to claim 1, wherein when the recording section performs recording on the medium, the recording section does not overlap with the first medium storage section when viewed vertically, and when the recording section performs recording on the medium, the recording section overlaps with the second medium storage section when viewed vertically.

3. The recording device according to claim 1, further comprising a reversing path by which the medium that passed through a position at which the medium faces the recording section is reversed in a direction including a vertically upward component by being transported in a transport direction including a vertically downward component and being made to pass through a curved reversing path curved so as to be convex downward, wherein the lower end of the curved reversing path in the vertical direction is vertically below an upper end of the first medium storage section in the vertical direction.

4. The recording device according to claim 3, wherein at least part of the curved reversing path is placed in a space formed by a difference in size between the first medium storage section and the second medium storage section.

5. The recording device according to claim 3, wherein there is no match between any horizontal position of the curved reversing path and any horizontal position of the first medium storage section, and there is a match between a horizontal position of the curved reversing path and a horizontal position of the second medium storage section.

6. The recording device according to claim 3, wherein there is no match between a horizontal position of an ejection position from which to eject a medium to the ejection tray and any horizontal position of the first medium storage section.

7. The recording device according to claim 6, wherein there is a match between the horizontal position of the ejection position and a horizontal position of the second medium storage section.

8. The recording device according to claim 6, wherein the curved reversing path is provided toward both horizontal sides of the horizontal position of the ejection position.

9. The recording device according to claim 3, wherein the supply path joins the reversing path, and the lower end of the curved reversing path in the vertical direction is vertically below the upper end of the curved supply path in the vertical direction.

10. The recording device according to claim 3, further comprising:

a first transport roller that transports the medium, the first transport roller being disposed upstream of the upper end of the curved supply path; and a second transport roller that transports the medium, the second transport roller being disposed downstream of the upper end of the curved supply path, wherein the supply path and the reversing path join together between the first transport roller and the second transport roller.

11. The recording device according to claim 3, wherein the position at which the supply path and the reversing path join together overlaps at least part of the first medium storage section when viewed horizontally.

12. The recording device according to claim 3, further comprising a supply roller located vertically above the curved supply path, the supply roller feeding the medium to an interior of the recording device through a supply tray protruding from a side surface of the recording device toward an outside of the recording device, wherein the reversing path includes a downward transport path located upstream of the curved reversing path, the downward transport path being inclined in a direction toward a central portion of the recording device from an outer surface of the recording device, the downward transport path being used to transport the medium in a transport direction including a vertically downward component, and at least part of the downward transport path and at least part of the supply roller overlap when viewed vertically.

13. The recording device according to claim 12, wherein supply roller does not overlap with the first medium storage section when viewed horizontally.

14. The recording device according to claim 3, further comprising a supply tray so as to protrude from a side surface of the recording device toward an outside, wherein the medium fed from the supply tray enters the reversing path after entering the supply path.

15. The recording device according to claim 1, wherein the first medium storage section is larger in vertical size than the second medium storage section.

16. The recording device according to claim 1, further comprising a transport path that passes through a position at which the transport path faces the recording section, the transport path forming an angle with respect to a horizontal direction and the vertical direction to transport the medium upward.

17. The recording device according to claim 16, wherein the transport path passing through the position at which the transport path faces the recording section is formed from a transport belt that transports the medium, and the transport belt is vertically above an upper end of the first medium storage section in the vertical direction.

18. The recording device according to claim 1, wherein the upper end of the curved supply path is vertically below an upper end of the first medium storage section in the vertical direction.

19. The recording device according to claim 1, further comprising a supply tray so as to protrude from a side surface of the recording device toward an outside, wherein the medium fed from the supply tray enters the supply path.

20. The recording device according to claim 19, wherein the medium fed from the supply tray enters the supply path on a downstream of the curved supply path.

* * * * *